US012794966B2

(12) United States Patent
Jimenez Martinez et al.

(10) Patent No.: US 12,794,966 B2
(45) Date of Patent: Nov. 10, 2026

(54) TELEMETRY BASED SYNTHETIC DATA TRACING FOR NETWORK AND APPLICATION PERFORMANCE

(71) Applicant: Cisco Technology, Inc., San Jose, CA (US)

(72) Inventors: Antonio Jimenez Martinez, Almeria (ES); Vu Thien Nga Nguyen, Weybridge (GB); Sergio Augusto Sousa Freitas, Lisbon (PT); Xavier Vilaca, Lisbon (PT); Pedro Rocha Gonçalves, Lisbon (PT); Vitaly Kumov, Paco de Arcos (PT); Serhiy Boychenko, Carris (PT)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 18/796,946

(22) Filed: Aug. 7, 2024

(65) Prior Publication Data

US 2026/0046329 A1 Feb. 12, 2026

(51) Int. Cl.
*H04L 67/025* (2022.01)
*H04L 43/08* (2022.01)

(52) U.S. Cl.
CPC ............ *H04L 67/025* (2013.01); *H04L 43/08* (2013.01)

(58) Field of Classification Search
CPC .............................. H04L 67/025; H04L 43/08
See application file for complete search history.

(56) References Cited

U.S. PATENT DOCUMENTS

| | | | | |
|---|---|---|---|---|
| 11,665,078 | B1 | 5/2023 | Ashlock et al. | |
| 11,882,012 | B2 | 1/2024 | Ashlock et al. | |
| 11,929,898 | B1 * | 3/2024 | Ittelson | H04L 65/1069 |
| 2021/0279632 | A1 * | 9/2021 | Di Pietro | G06N 20/00 |
| 2022/0121628 | A1 | 4/2022 | Devaraj et al. | |
| 2022/0171689 | A1 | 6/2022 | Barnsteiner et al. | |
| 2022/0201088 | A1 | 6/2022 | Greifeneder et al. | |
| 2023/0034229 | A1 * | 2/2023 | Oliveira | H04L 43/045 |

(Continued)

OTHER PUBLICATIONS

Ted Hulick et al, Open Telemetry Line Protocol (OTLP) Ingestion Of Proprietary Metric, Log, And Tracing Sources Using And Interim Common Export Format (CSV), Apr. 25, 2024, Technical Disclosure Commons, Defensive Publications Series, pp. 2-3 (Year: 2024).*

(Continued)

*Primary Examiner* — Joseph L Greene
(74) *Attorney, Agent, or Firm* — Edell, Shapiro & Finnan, LLC

(57) ABSTRACT

Methods for streaming pageload telemetry data as open telemetry data in a push-based approach are provided. Specifically, methods involve obtaining, from a monitoring agent, telemetry data associated with one or more network communications provided to a web-based service and generating web performance telemetry data from the telemetry data by injecting one or more attributes about at least one of the monitoring agent or the one or more network communications. The one or more attributes are obtained separately from the telemetry data. The methods further involve streaming the web performance telemetry data to one or more observability services.

20 Claims, 5 Drawing Sheets

(56) References Cited

U.S. PATENT DOCUMENTS

| | | | | |
|---|---|---|---|---|
| 2023/0318929 | A1 * | 10/2023 | Soosahabi | G06F 11/3688 709/224 |
| 2024/0064075 | A1 | 2/2024 | Ashlock et al. | |
| 2024/0259281 | A1 | 8/2024 | Mermoud et al. | |
| 2024/0259879 | A1 * | 8/2024 | Ranganath | H04W 28/18 |
| 2025/0016050 | A1 * | 1/2025 | Vicario | H04L 41/0823 |
| 2025/0184243 | A1 * | 6/2025 | Negodin | H04L 41/5009 |

OTHER PUBLICATIONS

Cisco Devnet: "Create HTTP Page Load Instant Test", ThousandEyes API v7, Retrieved from https://developer.cisco.com/docs/thousandeyes/create-http-page-load-instant-test/ on Jul. 24, 2024, 8 Pages.

Cisco Devnet: "List Page Load Tests", ThousandEyes API v7, Retrieved from https://developer.cisco.com/docs/thousandeyes/list-page-load-tests/ on Jul. 24, 2024, 6 Pages.

Cisco Thousandeyes: "Enterprise Agents in the Modern Enterprise Network", Retrieved from https://www.thousandeyes.com/product/enterprise-agents on Jul. 24, 2024, 10 Pages.

Datadog: "Monitoring Page Performance", Retrieved from https://docs.datadoghq.com/real_user_monitoring/browser/monitoring_page_performance/ on Jul. 24, 2024, 10 Pages.

Debugbear: "How To Measure And Optimize Page Load Time", Web Performance, Last updated on Jan. 31, 2024, Retrieved from https://www.debugbear.com/docs/page-load-time#:~:text=page%20load%20time%3F-,%E2%80%8B,to%20optimize%20your%20website%20performance, 12 Pages.

Github: "OTLP Receiver", Open-telemetry/opentelemetry-collector, Retrieved from https://github.com/open-telemetry/opentelemetry-collector/blob/main/receiver/otlpreceiver/README.md on Jul. 24, 2024, 2 Pages.

OpenTelemetry: "OpenTelemetry Protocol Exporter", Retrieved from https://opentelemetry.io/docs/specs/otel/protocol/exporter/ on Jul. 24, 2024, 6 Pages.

Pagespeed Insights: "Method: Pagespeedapi.runpagespeed", Google for Developers, Retrieved from https://developers.google.com/speed/docs/insights/rest/v5/pagespeedapi/runpagespeed#:~:text=Runs%20PageSpeed%20analysis%20on%20the,page%20faster%2C%20and%20other%20information on May 7, 2024, 16 Pages.

Thousandeyes Documentation: "Page Load Tests", Jun. 22, 2022, Retrieved from https://docs.thousandeyes.com/product-documentation/browser-synthetics/page-load-tests, 1 Page.

Thousandeyes Documentation: "Using the Page Load View", Retrieved from https://docs.thousandeyes.com/product-documentation/browser-synthetics/page-load-tests/using-the-page-load-view on Jul. 24, 2024, 10 Pages.

Github: "OTLP gRPC Exporter", Opentelemetry-collector, Retrieved from https://github.com/open-telemetry/opentelemetry-collector/blob/main/exporter/otlpexporter/README.md on Jan. 6, 2026, pp. 1-2.

* cited by examiner

TELEMETRY BASED SYNTHETIC DATA TRACING FOR NETWORK AND APPLICATION PERFORMANCE

TECHNICAL FIELD

The present disclosure generally relates to computer networks and systems.

BACKGROUND

Users may connect to services or webpages through a browser on their devices via the Internet. Monitoring applications may manage and monitor performance of these services or webpages. Monitoring applications, among others, may measure performance of webpage loading e.g., by simulating real users using the browser to access an application or a webpage. For example, these applications typically calculate load timing for an entire webpage as well as for elements within the Document Object Model (DOM).

DETAILED DESCRIPTION OF EXAMPLE EMBODIMENTS

Overview

Figure 1:
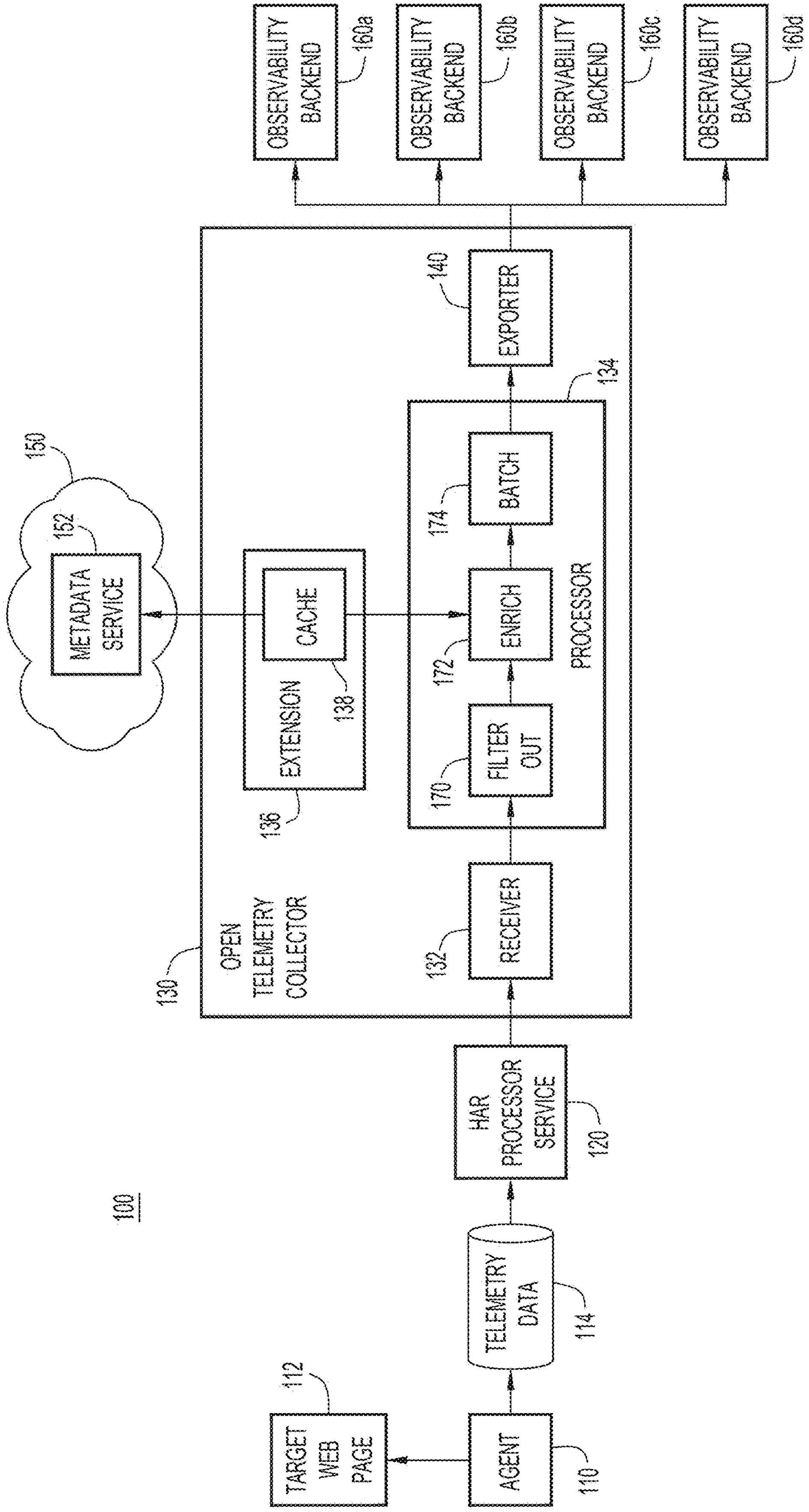
FIG. 1 is a block diagram illustrating a system in which web performance telemetry data is generated based on telemetry data related to a web-based service and is streamed to one or more observability services, according to an example embodiment.

Techniques presented herein provide for streaming pageload telemetry data as a trace using open telemetry protocol (OTLP) in a push-based approach such that page load data is received by observability service(s) in real-time for correlations, analysis, and generation of alerts.

In one form, methods involve obtaining, from a monitoring agent, telemetry data associated with one or more network communications provided to a web-based service and generating web performance telemetry data from the telemetry data by injecting one or more attributes about at least one of the monitoring agent or the one or more network communications. The one or more attributes are obtained separately from the telemetry data. The methods further involve streaming the web performance telemetry data to one or more observability services.

Example Embodiments

As noted above, assurance services and/or monitoring applications typically calculate load timing for an entire webpage as well as for elements within the DOM. The results of page load tests may then be stored in a hypertext transfer protocol (HTTP) archive file, commonly referred to as a HAR file. The HAR file includes metrics (telemetry data) about each object downloaded during the test. These monitoring applications may then visualize the loading process in a HAR format e.g., as a waterfall chart.

Telemetry data, sometimes called “collection data” or “measurement data”, are values obtained from monitoring i.e., monitoring by monitoring agent performance of one or more web pages and/or web applications. The telemetry data includes various information such as identifiers, timestamps, etc.

Waterfall charts are typically visualized through web-based tools. For example, users may access a web page, input their website’s uniform resource locator (URL), and obtain page speed metrics, which are then visualized in a waterfall chart. Alternatively, the raw data to construct these charts can be obtained via a representational state transfer (REST) application programming interface (API). In related art, this data access follows a pull-based model in which users proactively request data either by visiting a web page or by making calls to the REST API. In short, users initiate periodic data retrievals in a pull-based model.

The techniques presented herein provide for streaming of pageload HAR telemetry data as trace(s) using OTLP format in a push-based approach. Thus, users receive the page load data on their observability backend in real time. In other words, the techniques presented herein provide a way to access the page load telemetry test data in an OTLP format using a push model via open telemetry in real-time.

In one or more example embodiments, automatic and continuous export of web performance data or telemetry data is provided to one or more observability platforms. Thus, the process is streamlined and data analytics is made efficient and more readily available. Instead of visual dashboards and REST API of the related art, users access page load telemetry data via a push-based model. The techniques presented herein deploy automated page load performance testing that uses agent-based method(s). Specifically, monitoring agents periodically run synthetic tests to generate web performance telemetry data, such as page load metrics. This data is processed and is then exported in real-time to the user’s observability backend (observability platform(s)). This enables users to correlate the web performance telemetry data with similar data gathered from other sources to construct a comprehensive distributed tracing, which may result in alerts and reconfiguration actions.

The techniques presented herein involve an integration of monitoring agents performing synthetic tests and transmitting page load telemetry data, primarily composed of HAR data with a novel HAR processor service and/or open telemetry collector. The HAR data is transformed or converted into OTLP format and is then pushed to any observability backend configured by user. The generated traces may be correlated with additional application performance management (APM) data within the backend by utilizing distributed tracing.

FIG. 1 is a block diagram illustrating a system 100 in which web performance telemetry data is generated based on telemetry data related to a web-based service and is streamed to one or more observability services, according to an example embodiment. The system 100 includes a monitoring agent 110, a HAR processor service 120, an OpenTelemetry collector (collector 130) connected, via one or more networks 150, to a metadata service 152 and is configured to stream web performance telemetry data (enriched telemetry data) to a plurality of observability platforms 160*a-d*.

The notations 1, 2, 3, . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario. In other words, this is only an example of the system 100, and the number and types of entities may vary based on a particular deployment and use case scenario. For example, while one monitoring agent (the monitoring agent 110) is depicted, the number of monitoring agents may vary based on a particular deployment and use case scenario.

In various example embodiments, the entities of the system 100 (the monitoring agent 110, the HAR processor service 120, the collector 130, the metadata service 152, and the plurality of observability platforms 160*a-d*) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) such as the one or more networks 150. Each entity may include internal and external hardware components such as those depicted and described in further detail in FIG. 5. In one example, at least some of these entities may be embodied as virtual devices with functionality distributed over a number of hardware devices such as virtual switches, routers, in a cloud, etc.

The one or more networks 150 include a plurality of network devices, which are transport nodes (e.g., switches, routers, leaf nodes, spine nodes, etc.) configured to transmit network communications between entities of the system 100. The one or more networks 150 may include internal communication networks and/or external communication networks such as the Internet.

The monitoring agent 110 may be a synthetic agent, a synthetic tracing agent, a synthetic web agent such as a dedicated test device configured for implementation with a software monitoring platform. The software monitoring platform may provide visibility and enable actions to maintain and optimize digital services such as web application experience and performance. The monitoring agent 110 may involve one or more hardware devices such as a computing device in FIG. 5. The monitoring agent 110 may be configured to access, via Internet, a target web page 112 e.g., an application server that provides the target web page 112, and fetch, load, and process code for the target web page 112. In one example, the monitoring agent 110 may execute one or more browser instances of a browser to access the target web page 112. That is, the monitoring agent 110 may establish one or more connections with the target web page 112 and run performance page load tests periodically e.g., based on user and/or system settings.

The performance page load tests may include but are not limited to testing the target web page 112 for loading speed of elements within the DOM, the entire page, etc. The performance page load tests includes a plurality of requests. The performance page load tests may measure how long it takes to download and display content or elements of the webpage in a browser window (typically measured in seconds). For example, the monitoring agent 110 may simulate multiple users using a browser to access the target web page 112. As another example, the performance page load tests may involve browser-based load testing scripts that include instructions (the plurality of requests) to navigate to an element on the target web page 112, type text in a field or a box in the target web page 112, and/or click a button in the target web page 112.

In one or more example embodiments, the monitoring agent 110 executes performance page load tests periodically. The performance page load tests generate telemetry data 114 associated with one or more network communications provided to a web-based service such as the target web page 112. For example, the telemetry data 114 may be responsive to the plurality of requests in the synthetic test i.e., page load performance metrics. The monitoring agent 110 may then aggregate the telemetry data 114 and send the telemetry data to the HAR processor service 120 using an internal message queue. In one example embodiment, the monitoring agent 110 may stream telemetry data 114 that is responsive to network communications in the page load test to the HAR processor service 120.

Figure 5:
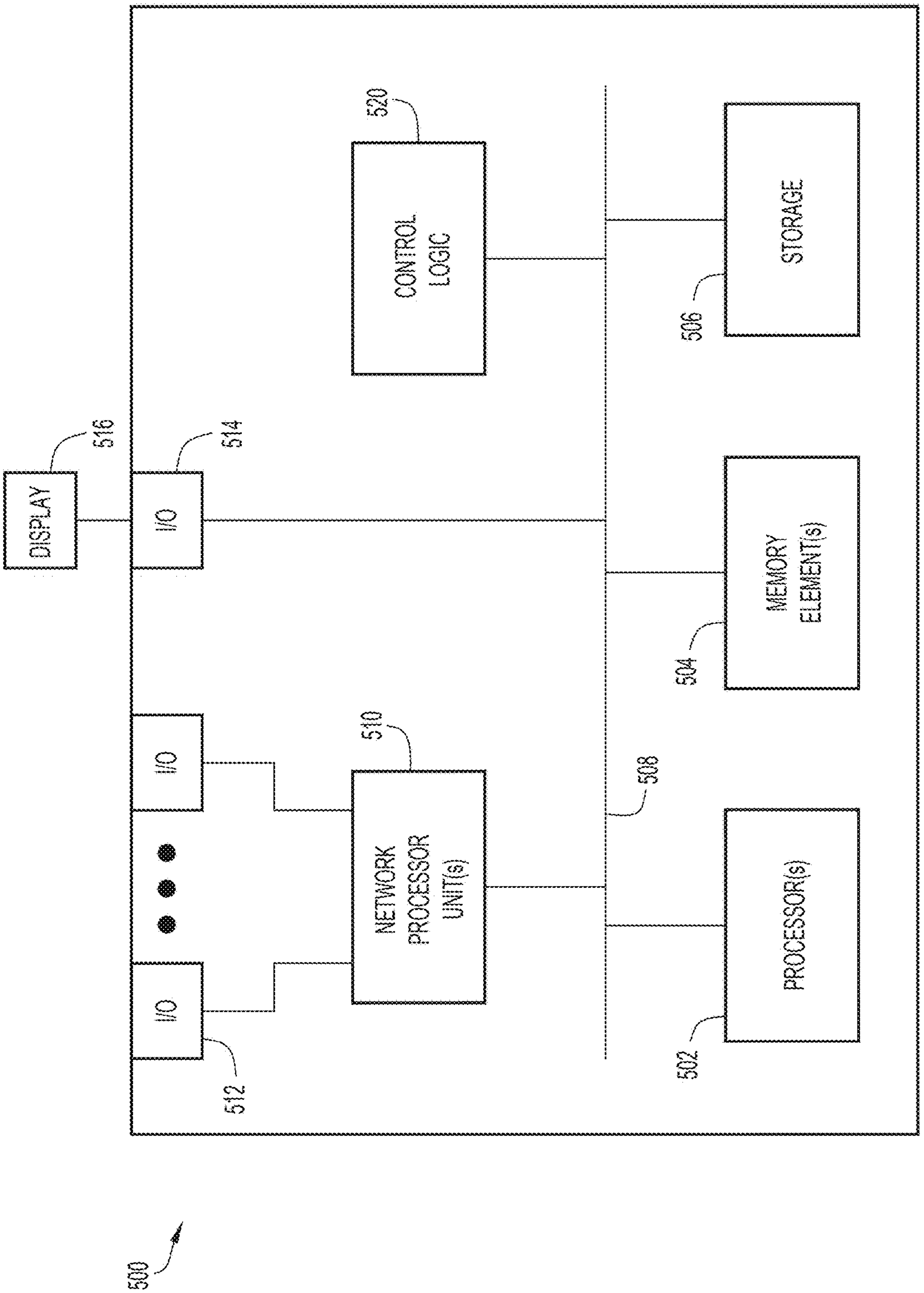
FIG. 5 is a hardware block diagram of a computing device that may perform functions associated with any combination of operations in connection with the techniques depicted and described in FIGS. 1-4, according to various example embodiments.

The HAR processor service 120 may involve one or more hardware devices such as a computing device in FIG. 5. The HAR processor service 120 may be integrated with the monitoring agent 110 and/or the collector 130. The HAR processor service 120 is configured to receive the telemetry data 114 from the monitoring agent 110. That is, the HAR processor service 120 receives performance metrics and HAR with a list of requests from the message queue. The HAR processor service 120 converts the telemetry data 114 in a HAR format to OTLP i.e., by generating traces and spans detailed in FIG. 2.

Figure 2:
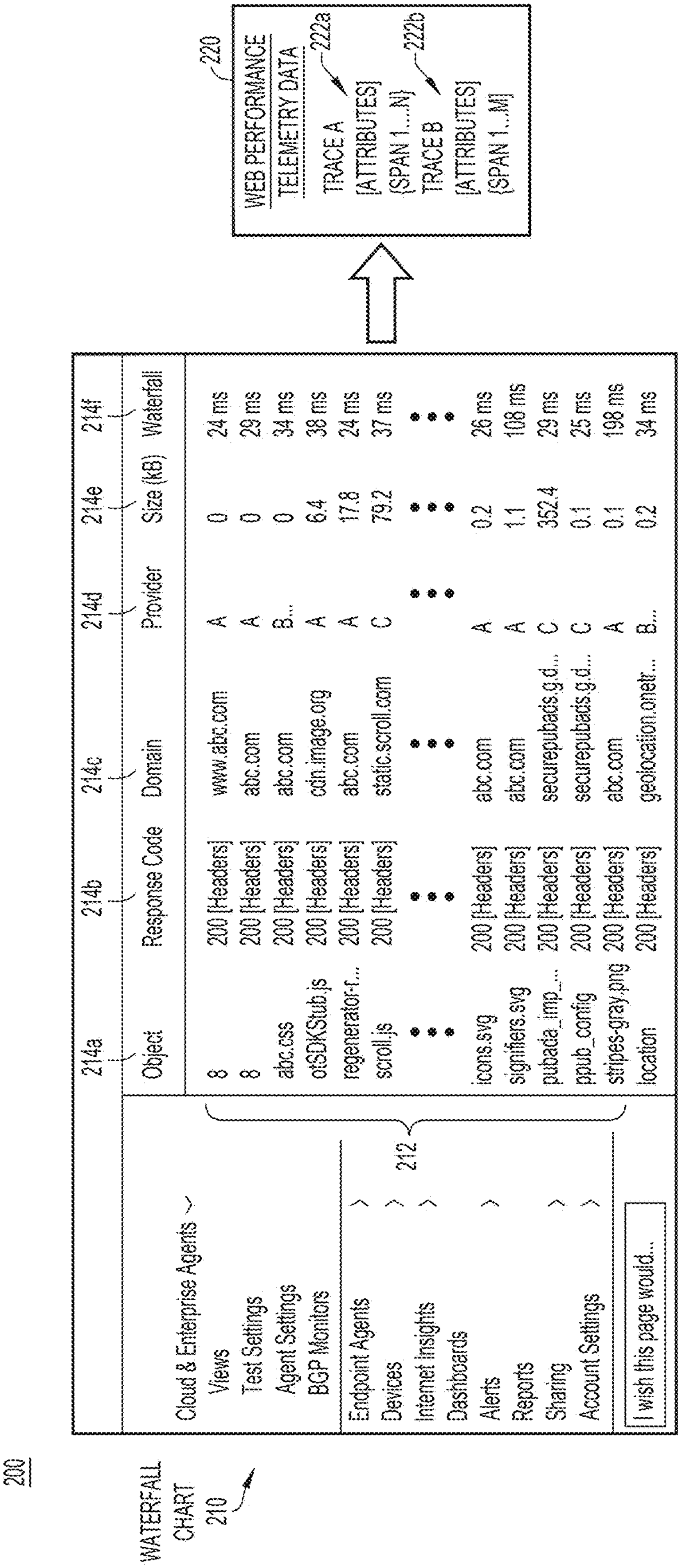
FIG. 2 is a diagram illustrating a conversion process, performed by a processor service, in which telemetry data responsive to synthetic test(s) is converted into an open telemetry format, according to an example embodiment.

With continued reference to FIG. 1, FIG. 2 is a diagram illustrating a conversion process 200, performed by the HAR processor service 120, in which telemetry data 114 of FIG. 1 that is responsive to synthetic test(s), is converted into an open telemetry format, according to an example embodiment. The conversion process 200 involves a waterfall chart 210, as an example of the telemetry data 114 responsive to one or more network communications in a synthetic test. The conversion process 200 results in web performance telemetry data 220 that includes a trace A 222*a* and a trace B 222*b*.

In addition to being responsive to a synthetic test and including the page load performance metrics (start and end times of each request in the synthetic test), the telemetry data 114 may further include an identification of the monitoring agent 110 and/or synthetic test(s) performed by the monitoring agent 110. For example, the telemetry data 114 may include a first identifier of the monitoring agent 110, a second identifier of the synthetic test, and a HAR with the list of requests in the synthetic test. The telemetry data 114 may be in a form of the waterfall chart 210. The waterfall chart 210 includes a list of objects 212 on the target web page 112. For each object in the target web page 112, the waterfall chart 210 may include an object name 214*a*, an HTTP response code 214*b*, a domain 214*c*, a provider 214*d*, the size 214*e* of the object, and a stacked bar chart 214*f* that includes individual timings (load times in seconds or milliseconds). By hovering over any object or column in the waterfall chart 210, additional views may be provided such as pie charts with bytes received and respective receipt times, average page load time, etc.

The HAR processor service 120 converts or translates the telemetry data (HAR data) into web performance telemetry data (OpenTelemetry data). That is, the waterfall chart 210 is translated into multiple traces such as a trace A 222*a* having attributes and spans 1 . . . n and a trace B 222*b* having attributes and spans 1 . . . m. A span may represent an individual unit of work e.g., one request in a synthetic test performed by the monitoring agent 110. A trace may include one or more spans, and may represent the loading of the entire or completed web page (the target web page 112). Spans and traces may help measure the duration of the corresponding units of work and, therefore, the duration of the request processing (object/web page loading) within a web page application.

The waterfall chart 210 is translated into the trace A 222*a* and the trace B 222*b* (OpenTelemetry data). Each trace has attributes such as a first identifier of a resource (the monitoring agent 110) and a second identifier of the synthetic test. Each span may include metadata of a respective request in the synthetic test (e.g., loading of object A in the web page being tested) and the page load performance metrics.

Metadata may include information about the respective request such as full uniform resource locator (url.full), the request or network communication (htttp.request.method), the response that is responsive to the request (http.response.status_code). In one example embodiment, the response may be an HTTP response code that is sent to the monitoring agent 110 indicating how the web server of the target web page 112 responded to the request (fulfilled, error occurred, etc.). For example, the codes may be a first predetermined value for successful completion of the request, a second predetermined value for an internet server error, a third predetermined value for exceeding available resources or rate, a fourth predetermined value for a redirect, etc.

The page load performance metrics may include a start time of the respective request and an end time of executing the respective request. For example, a first timestamp (the start time) indicating the time at which the monitoring agent 110 provided the request to the web server executing the target web page 112 and a second timestamp (the end time) indicating the time at which the monitoring agent 110 received the response e.g., the first predetermined value for successful completion of the request (200-object loaded). The start time and end time of the request are just examples of page load performance metrics. The disclosure is not limited to these page load performance metrics.

The HAR processor service 120 is configured to translate the waterfall chart 210 into the OpenTelemetry data (the web performance telemetry data 220) and send it to the collector 130. For example, the HAR processor service 120 sends the web performance telemetry data 220 having the trace A 222*a* and trace B 222*b* using an OpenTelemetry Protocol Exporter e.g., traces are sent to the collector 130 using remote procedure calls (gRPC) OtlpExporter.

Referring back to FIG. 1, the collector 130 is configured to receive, process, enrich, and export OTLP data to a plurality of observability services 160*a-d*. Specifically, the collector 130 includes a receiver 132, a processor 134, an extension 136 having a local storage such as cache 138, and an exporter 140.

The receiver 132 is configured to receive the web performance telemetry data 220 having the trace A 222*a* and the trace B 222*b*. The trace A 222*a* and the trace B 222*b* are received in OTLP format. For example, the receiver 132 may be a gRPC OtlpReceiver. The web performance telemetry data 220 is the waterfall chart 210 that is translated by the HAR processor service 120 into the Open Telemetry format.

The processor 134 is configured to process the web performance telemetry data 220 and generate enhanced or enriched web performance telemetry data. In one or more example embodiments, the processor 134 generates enriched web performance telemetry data by perform the following operations.

At 170, the processor 134 filters out stale data in the web performance telemetry data 220. That is, the processor 134 analyzes each of the trace A 222*a* and trace B 222*b* to remove old or stale telemetry data (i.e., not real-time data) to ensure that only real-time data is streamed to the observability services 160*a-d*. In other words, one or more stale performance metrics are removed from the web performance telemetry data 220 based on a predetermined time threshold to generate real-time telemetry data. For example, if start time and/or end time are before the predetermined time threshold, the metric values are stale. The span(s) that includes these start and/or end times (stale data) are removed or deleted from the web performance telemetry data 220.

At 172, the processor 134 is configured to add one or more additional attributes to the filtered web performance telemetry data. In other words, the processor 134 dynamically enriches or inject the filtered web performance telemetry data with attributes that are obtained separately from the telemetry data e.g., from a local storage (the cache 138).

Specifically, to provide more context to the web performance telemetry data 220, the processor 134 adds extra attributes to traces' resource and spans. These additional attributes are not present in the original source of the data and are obtained separately from the telemetry data by the extension 136.

In one or more example embodiments, the extension 136 of the collector 130 may perform the following operations in the background. The extension 136 may query one or more external services such as the metadata service 152 for extra metadata (additional attributes) for all the synthetic tests and monitoring agents from different internal services and store the metadata in the cache 138. The cache 138 is refresh periodically. The metadata locally stored in the cache 138 (local storage) may be retrieved using a test identifier and an agent identifier.

As web performance telemetry data enters the pipeline's enrichment phase (at 172), metadata is quickly retrieved from the cache 138 and added as additional attributes into the resources of the trace and its associated spans. By way of a non-limiting example, among the many attributes that may be added, the following additional attributes are noted: a name of the synthetic test (test.name), a type of the test (test.type), an url, a name of the monitoring agent 110 (agent.name), and a location of the monitoring agent 110 (agent.location). The url attribute identifies a webpage to be tested e.g., http://www.enterprisepagefortest.com. By way of an example, additional attributes may further include domain of the test (test.domain) such as a cloud and enterprise monitoring agent, endpoint monitoring agent, internal monitoring agent, etc. and/or integration identifier (integration.id) that assigns a unique identifier for an integration between the synthetic tests and a target observability backend selected from the observability services 160*a-d*.

At 174, the processor 134 is configured to batch the filtered and enriched web performance telemetry data and provide the batch of the web performance telemetry data 220 to the exporter 140.

The exporter 140 is configured with a multi-tenancy approach i.e., is a multi-tenancy exporter that instantiates dedicated exporter instances for each observability platform to which the web performance telemetry data 220 is to be provided. For example, the exporter 140 instantiates a dedicated instance of the Otlp Exporter for each of the observability services 160*a-d* to which the batch of the web performance telemetry data 220 is streamed e.g., a first observability service 160*a* and a second observability service 160*b* (and not to a third observability service 160*c* and a fourth observability service 160*d*). The exporter 140 then replicates the web performance telemetry data for the second observability service 160*b* and streams the web performance telemetry data to the first observability service 160*a* and the second observability service 160*b*. Thus, the exporter 140 uses a multi-tenancy approach and sends OTLP traces to an observability backend (the first observability service 160*a* and second observability service 160*b*) using gRPC/HTTP OtlpExporter.

In one or more example embodiments, a user or a system may generate a page load test and associate it with an integration. A target observability backend such as the first observability service 160*a* and/or the second observability service 160*b* is specified within this integration. Within an OpenTelemetry pipeline, web performance telemetry data from users are processed by the collector 130 and is to be routed correctly i.e., the correct web performance telemetry data to respective user. As such, each integration maintains a list of associated synthetic tests. A unique or dedicated OtlpExporter is instantiated for each integration to handle data export. The web performance telemetry data for a respective synthetic test is replicated as needed for each associated integration. Subsequently, each integration exports its copy of the web performance telemetry data to its designated observability backend e.g., the first observability service 160*a* and the second observability service 160*b*.

The collector 130 is configured to stream pageload HAR telemetry data as traces using OTLP format in a push-based approach. As such, users receive the page load data (the web performance telemetry data) on their observability backend in real-time. That is, the web performance telemetry data is streamed to an observability service associated with a respective integration (dedicated to the observability service). The collector 130 may thus provide access to the page load telemetry test data in an OTLP format using a push-based model via OpenTelemetry in real-time. As such, users need not query for the telemetry data, the telemetry data (without stale data and with added attributes) is pushed or streamed to user's observability platform(s) using the OTLP format.

The observability services 160*a-d* are configured to correlate the web performance telemetry data to other application performance management data obtained from other external sources for a comprehensive distributed tracing. The observability services 160*a-d* may generate alerts based on comprehensive tracing e.g., based on the web performance telemetry data obtained in real-time correlated to other network telemetry data. For example, users receive, in real time, traces that include web performance test data on their observability backends. Users may then correlate this data with other application performance management data using comprehensive distributed tracing. For example, streaming web performance telemetry data may allow engineers/operators to consume an object on the target web page 112 involved in responding to a given synthetic request and identify which object/element on the target web page 112 might be performing poorly e.g., experiences high latency in loading. High latency (latency above a predetermined time threshold) may result in an alert and one or more configuration actions. For instance, an alternative object may be manually or automatically chosen or an object may be removed from the target web page 112. Based on the comprehensive distributed tracing, resources may be added to improve loading speed or the object may be moved to a different web server to improve the loading speed.

Figure 3:
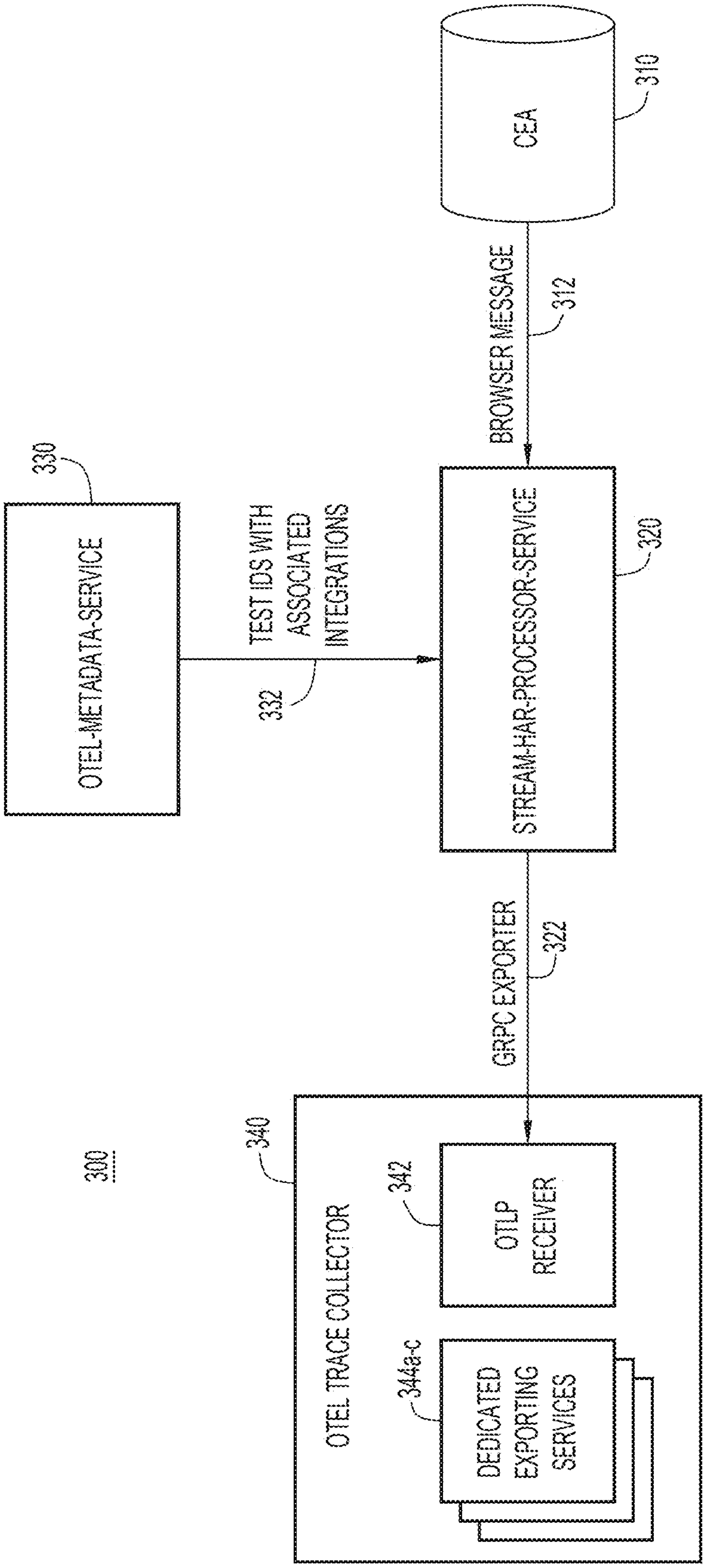
FIG. 3 is a block diagram illustrating a system in which distributed tracing is generated based on telemetry data related to a web-based service, according to an example embodiment.

With continued reference to FIGS. 1 and 2, FIG. 3 is a diagram illustrating a system 300 that generates distributed tracing based on telemetry data related to a web-based service, according to an example embodiment. The system 300 includes a cloud enterprise agent (cea 310), a stream HAR processor service 320, an OTEL metadata service 330, and an OTEL trace collector 340 having an OTLP receiver 342 and dedicated exporting services 344*a-c*.

It will be appreciated that the techniques described herein may be compatible with any suitable mechanism for collecting telemetry data. One such mechanism may be the OpenTelemetry tracing specification but is provided by way of an example only. The OpenTelemetry tracing specification specifies a collection of tools, APIs, and Software Development Kits (SDKs) that are useful to collect and export telemetry data (metrics and traces). The techniques presented herein extend the OpenTelemetry tracing to analyze web page performance and to provide a push-based approach for streaming web performance telemetry data in real-time (with attributes being added and without stale data determined based on a time threshold). With OpenTelemetry technology, comprehensive distributed tracing may involve measuring the performance and behavior of web pages or web applications using the concepts of spans and traces and correlating them with one another for more efficient and dynamic data analysis and changing the configuration of resources based on these analysis e.g., web server, etc.

The cea 310 may be implemented as an Apache Kafka® agent or CEA Kafka clusters (e.g., synthetic web agents). The cea 310 generates telemetry data associated with one or more network communications provided to a web-base service (page load tests having requests and responses). The cea 310 adds the telemetry data to a browser message 312, which is then streamed to the stream HAR processor service 320.

The stream HAR processor service 320 converts the telemetry data (e.g., waterfall of the pageload/transaction tests) into spans of a trace and exports these traces by an OpenTelemetry pipeline e.g., the gRPC exporter 322, to the OTEL trace collector 340. That is, the stream HAR processor service 320 reads the browser message 312 from the cea 310, filters relevant messages, and converts the telemetry data to open telemetry format (traces having spans).

In one example embodiment, the stream HAR processor service 320 obtains a list of synthetic tests (e.g., test IDs with associated integrations 332) from the OTEL metadata service 330. The test IDs with the associated integrations 332 may be configured by a user and pushed into the OTEL metadata service 330. The integration identifies a respective observability service which is to be provided with the web performance telemetry data. Based on the integration, a dedicated exporting service is initiated and web performance telemetry data is replicated for each dedicated exporting service.

The stream HAR processor service 320 may then periodically query the OTEL metadata service 330 for the test IDs with associated integrations 332. In yet another example embodiment, the test IDs with associated integrations 332 may be pushed to the stream HAR processor service 320 (as opposed to being queried for) based on detecting a change in the list of synthetic tests.

The stream HAR processor service 320 may locally store the test IDs with associated integrations 332 e.g., in a cache. The stream HAR processor service 320 analyzes the test IDs with the associated integrations 332 to determine monitoring agents and relevant synthetic tests performed by the monitoring agents. For example, the stream HAR processor service 320 subscribes to the cea 310 with appropriate topics (e.g., agentPageloadHar) to get the browser message 312 with the pageload telemetry data.

The stream HAR processor service 320 filters the messages received based on test IDs. That is, messages for the test IDs that match the test IDs with associated integrations 332 are maintained while others are removed. The stream HAR processor service 320 then converts data in the browser message 312 into trace(s) and exports the traces to OTEL trace collector 340 using gRPC exporter 322.

Specifically, the stream HAR processor service 320 processes a HAR entry and generates a trace identifier and a span identifier for the HAR entry, at runtime. That is, HAR entries do not include trace identifier and/or span identifier header, and as such, the stream HAR processor service 320 generates these identifiers at runtime.

In some instances where the user may be instrumenting their application. It may be possible that the HAR entry includes a trace identifier and/or a span identifier header. In those cases, instead of generating these identifiers at runtime, the stream HAR processor service 320 reuses existing identifiers in the HAR entry when converting HAR entry into a trace with spans.

In any event, the stream HAR processor service 320 may overwrite headers of the HAR telemetry data by generating identifiers for the spans and identifiers for the traces. The trace identifier is to be the same for all spans within a trace. In one example embodiment, the HAR entry may include a trace identifier and a span identifier headers such as:

X-B3-Sampled: 1

X-B3-Spanid: abcd1234567890

X-B3-Traccid: abcdefghijkl1234567890

In case when the HAR entry includes trace/span identifiers, when generating a respective span, the stream HAR processor service 320 overwrites the trace identifier with that of a header and sets the parent span identifier to the span identifier from the header and then generates a span identifier for this span. By reusing existing identifiers, the user may be able to correlate the synthetic data generated by the stream HAR processor service 320 (trace with spans) with telemetry data of their application because for these cases the same trace identifier and span identifier may be used. Otherwise, the trace identifier and the span identifier are generated while the parent span identifier is set to null. The web performance telemetry data that includes traces having spans is provided to the OTEL trace collector 340 using the gRPC exporter 322.

The OTEL trace collector 340 includes the OTLP receiver 342 that is configured to receive the web performance telemetry data. The OTEL trace collector 340 is configured to support trace datapoints and to stream the web performance telemetry data to one or more observability services. The OTEL trace collector 340 filters the web performance telemetry data based on a predetermined time threshold (e.g., removes stale performance metrics). The OTEL trace collector 340 injects additional attributes (adds labels with additional information about the monitoring agent and/or test such as location, test type, etc.) based on separately querying various metadata services, batches the web performance telemetry data and exports it to one or more observability services based on associated integrations.

That is, the OTEL trace collector 340 may initiate one of the dedicated exporting services 344*a*-*c* for each integration and replicate the web performance telemetry data for this integration. Based on the streamed web performance telemetry data from the initiated, dedicated exporting service, the observability services may generate alerts when start or end times exceed a predetermined time threshold.

By way of an example, a trace model that is replicated and streamed to an observability service by initiating a respective one of dedicated exporting services 344*a*-*c*, is provided below.

```
"resourceSpans": [
{"resource": {
"attributes": [
  {"key": "test.id",
    "value": {
    "stringValue": "12345"
      }
    },
{"key": "test.domain",
"value": {
"stringValue": "cea"
}
},
{"key": "test.type",
"value": {
"stringValue": "pageload"
}
},
{"key": "agent.id",
"value": {
"stringValue": "27820"
}
},
{"key": "agent.location",
"value": {
"stringValue": "New York"
}
},
{"key": "agent.name",
"value": {
"stringValue": "Albany, NY (Starlink)"
}
},
// additional test attributes may be included such as the url for pageload
and web transaction tests, as shown below
{"key": "url",
"value": {
"stringValue": "www.test.es"
}
}
]},
"scopeSpans": [
{"spans": [
{"traceId": "5B8EFFF798038103D269B633813FC60C",
"spanId": "EEE19B7EC3C1B174",
"parentSpanId": "EEE19B7EC3C1B173",
"name": "request1",
"startTimeUnixNano": "1544712660000000000",
"endTimeUnixNano": "1544712661000000000",
"attributes": [
{"key": "http.request.method",
"value": {
"stringValue": "GET"
}
},
{"key": "url.full",
"value": {
"stringValue":
“https://www.abc.defr/search?q=OpenTelemetry#SemConv”
}
},
{"key": "http.response.status_code",
```

-continued

```
"value": {
"stringValue": "200"
}
},
{"key": "round.id",
"value": {
"stringValue": "12456767665"
}
}
]...
```

In the model above, test domain, test type, agent location, agent name, and full url are examples of attributes obtained separately from an external source and added to the telemetry data provided by cea 310.

As such, techniques presented herein provide for streaming of pageload HAR telemetry data as one or more traces using OTLP format in a push-based manner. Thus, users receive the page load data on their observability backend in real-time. The techniques presented herein provide a way to access the page load telemetry test data in an OTLP (OpenTelemetry protocol) format in-real time for comprehensive tracing. Monitoring agents periodically run synthetic tests to generate telemetry data such as page load metrics. This data is then processed and extracted in a form of OpenTelemetry Protocol (OTLP) data, which is then exported in real-time to the user's observability backend (observability platforms). Techniques provide for filtering stale data and adding attributes to the web performance telemetry data. These additional attributes include information about the monitoring agent (type, location, name, etc.) and/or information about the synthetic test (type, name, domain, etc.). These additional attributes are separately obtained by querying external metadata services and are stored locally for quick access when generating web performance telemetry data. That is, the telemetry data is dynamically enriched with additional attributes. Moreover, a multi-tenancy exporter is provided. The multi-tenancy exporter is configured to initiate a dedicated exporting service for each observability service and replicate the web performance telemetry data for each exporting service. The techniques presented herein enable users to correlate web performance telemetry data with similar data gathered from other sources to construct comprehensive distributed tracing. That is, the traces may be correlated with additional Application Performance Management (APM) data within the backend by utilizing distributed tracing.

Figure 4:
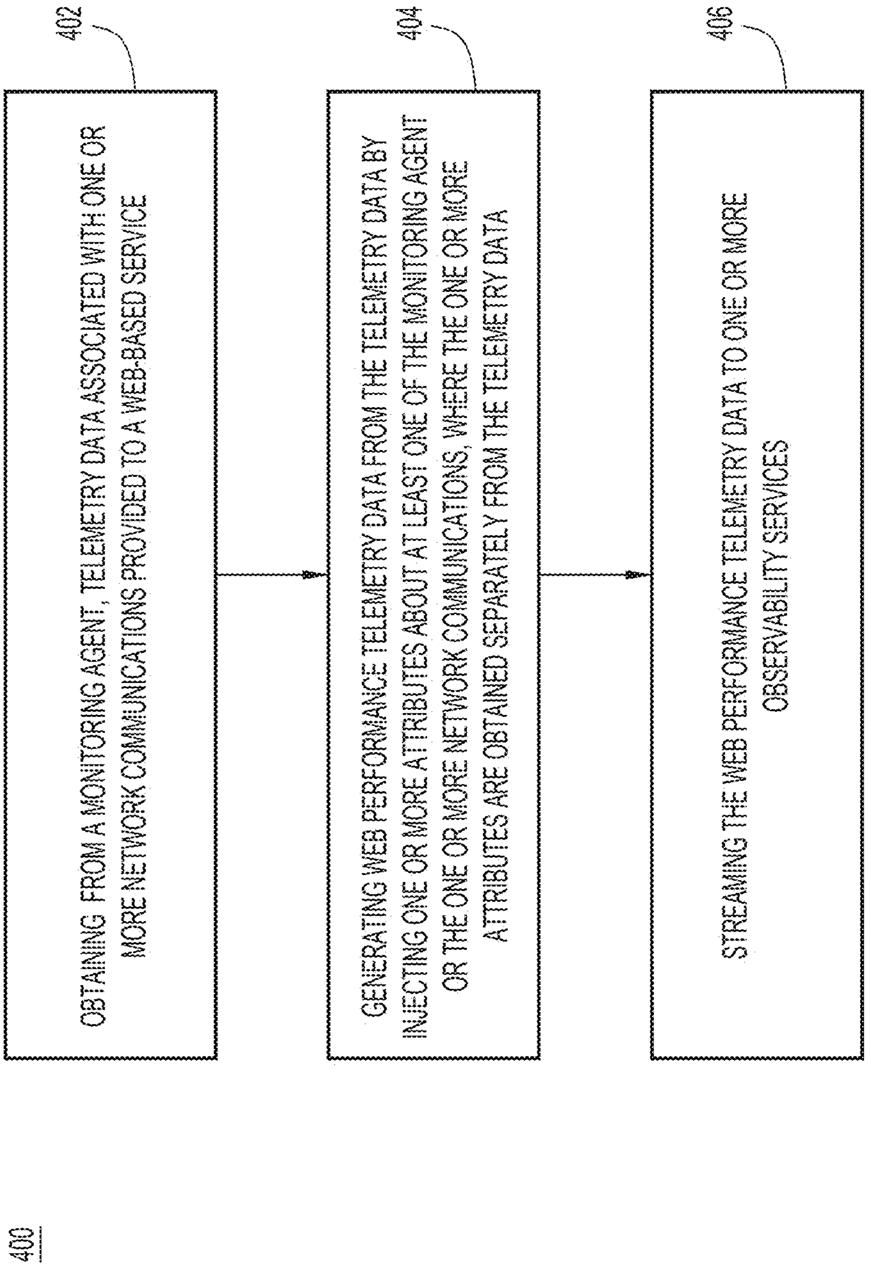
FIG. 4 is a flowchart illustrating a computer-implemented method of streaming web performance telemetry data to one or more observability services in a push-based approach, according to an example embodiment.

FIG. 4 is a flowchart illustrating a computer-implemented method 400 of streaming web performance telemetry data to one or more observability services in a push-based approach, according to an example embodiment. The computer-implemented method 400 may be performed by a computing device of FIG. 5 such as a server, a group of servers, or in a cloud. The computer-implemented method 400 may be performed by the collector 130 of FIG. 1 or the OTEL trace collector 340 and/or with the HAR processor service 120 or the stream HAR processor service 320, respectively.

The computer-implemented method 400 involves at 402, obtaining, from a monitoring agent, telemetry data associated with one or more network communications provided to a web-based service.

The computer-implemented method 400 further involves at 404, generating web performance telemetry data from the telemetry data by injecting one or more attributes about at least one of the monitoring agent or the one or more network communications. The one or more attributes are obtained separately from the telemetry data.

The computer-implemented method 400 further involves at 406, streaming the web performance telemetry data to one or more observability services.

In one form, the one or more network communications may include a synthetic test having a plurality of requests. The telemetry data may be responsive to the synthetic test and may include page load performance metrics.

According to one or more example embodiments, the computer-implemented method 400 may further involve converting the telemetry data from a Hypertext Transfer Protocol (HTTP) archive (HAR) format into an open telemetry protocol (OTLP) format.

In one instance, the computer-implemented method 400 may further involve translating each of the plurality of requests into a span that includes metadata of a respective request, and the page load performance metrics including a start time of the respective request and an end time of the respective request. The computer-implemented method 400 may further include generating at least one trace that includes a first identifier of the monitoring agent, a second identifier of the synthetic test, and a plurality of spans for the plurality of requests.

In another form, the operation 404 of generating the web performance telemetry data may further include periodically querying an external service associated with the monitoring agent for the one or more attributes and storing the one or more attributes in a local storage.

In yet another form, the operation 404 of generating the web performance telemetry data may further include removing one or more stale performance metrics from the telemetry data based on a predetermined time threshold to generate real-time telemetry data and obtaining, from the local storage, the one or more attributes based on the real-time telemetry data. The operation 404 of generating the web performance telemetry data may further include adding the one or more attributes to the real-time telemetry data.

According to one or more example embodiments, the one or more observability services may include a plurality of observability services. The computer-implemented method 400 may further include associating the one or more network communications with a first observability service and a second observability service of the plurality of observability services and replicating the web performance telemetry data for the second observability service.

In one instance, the one or more observability services may include a first observability service and a second observability service. The computer-implemented method 400 may further include initiating a dedicated exporting service for each of the first observability service and the second observability service. The dedicated exporting service may be configured to stream the web performance telemetry data in real-time on a push-based approach to a respective observability service.

In another instance, the one or more observability services may be configured to correlate the web performance telemetry data to other application performance management data obtained from other external sources for a comprehensive distributed tracing.

In yet another instance, the one or more observability services may generate an alert based on the web performance telemetry data obtained in real-time.

FIG. 5 is a hardware block diagram of a computing device 500 that may perform functions associated with any combination of operations in connection with the techniques depicted in FIGS. 1-4, according to various example embodiments, including, but not limited to, operations of the computing device or one or more servers that execute one or more entities of the system 100 of FIG. 1 (e.g., the monitoring agent 110, the HAR processor service 120, the collector 130, the metadata service 152, and/or the observability services 160*a-d*), and one or more entities of the system 300 of FIG. 3 (e.g., the cea 310, the stream HAR processor service 320, the OTEL metadata service 330, and/or the OTEL trace collector 340). Further, the computing device 500 may be representative of an apparatus such as one of the network devices, network/computing equipment, or hardware asset in the one or more networks 150. It should be appreciated that FIG. 5 provides only an illustration of one example embodiment and does not imply any limitations with respect to the environments in which different example embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various example embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various example embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 516 such as a computer monitor, a display screen, or the like.

In various example embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor of the apparatus is configured to perform a method including obtaining, from a monitoring agent, telemetry data associated with one or more network communications provided to a web-based service and generating web performance telemetry data from the telemetry data by injecting one or more attributes about at least one of the monitoring agent or the one or more network communications. The one or more attributes are obtained separately from the telemetry data. The method performed by the processor further includes streaming the web performance telemetry data to one or more observability services.

In yet another example embodiment, one or more non-transitory computer readable storage media encoded with instructions are provided. When the media is executed by a processor, the instructions cause the processor to execute a method that involves obtaining, from a monitoring agent, telemetry data associated with one or more network communications provided to a web-based service and generating web performance telemetry data from the telemetry data by injecting one or more attributes about at least one of the monitoring agent or the one or more network communications. The one or more attributes are obtained separately from the telemetry data. The method further involves streaming the web performance telemetry data to one or more observability services.

In yet another example embodiment, a system is provided that includes the devices or apparatuses and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining, from a monitoring agent, telemetry data associated with one or more network communications provided to a web-based service;

generating web performance telemetry data from the telemetry data by injecting one or more attributes about at least one of the monitoring agent or the one or more network communications, wherein the one or more attributes are obtained separately from the telemetry data; and streaming the web performance telemetry data to one or more observability services by:

instantiating, for each integration specifying a respective observability service of the one or more observability services, a dedicated exporter instance, replicating the web performance telemetry data for each instantiated dedicated exporter instance, and exporting the replicated web performance telemetry data to each respective observability service.

2. The computer-implemented method of claim 1, wherein the one or more network communications include a synthetic test having a plurality of requests, and the telemetry data is responsive to the synthetic test and includes page load performance metrics.

3. The computer-implemented method of claim 2, further comprising:

converting the telemetry data from a Hypertext Transfer Protocol (HTTP) archive (HAR) format into an Open Telemetry Protocol (OTLP) format.

4. The computer-implemented method of claim 2, further comprising:

translating each of the plurality of requests into a span that includes metadata of a respective request, and the page load performance metrics including a start time of the respective request and an end time of the respective request; and generating at least one trace that includes a first identifier of the monitoring agent, a second identifier of the synthetic test, and a plurality of spans for the plurality of requests.

5. The computer-implemented method of claim 4, wherein generating the web performance telemetry data further includes:

periodically querying an external service associated with the monitoring agent for the one or more attributes; and storing the one or more attributes in a local storage.

6. The computer-implemented method of claim 5, wherein generating the web performance telemetry data further includes:

removing one or more stale performance metrics from the telemetry data based on a predetermined time threshold to generate real-time telemetry data;

obtaining, from the local storage, the one or more attributes based on the real-time telemetry data; and adding the one or more attributes to the real-time telemetry data.

7. An apparatus comprising:

a memory;

a network interface configured to enable network communications; and a processor, wherein the processor is configured to perform a method comprising:

obtaining, from a monitoring agent, telemetry data associated with one or more network communications provided to a web-based service;

generating web performance telemetry data from the telemetry data by injecting one or more attributes about at least one of the monitoring agent or the one or more network communications, wherein the one or more attributes are obtained separately from the telemetry data; and streaming the web performance telemetry data to one or more observability services by:

instantiating, for each integration specifying a respective observability service of the one or more observability services, a dedicated exporter instance, replicating the web performance telemetry data for each instantiated dedicated exporter instance, and exporting the replicated web performance telemetry data to each respective observability service.

8. The apparatus of claim 7, wherein the one or more network communications include a synthetic test having a plurality of requests, and the telemetry data is responsive to the synthetic test and includes page load performance metrics.

9. The apparatus of claim 8, wherein the processor is further configured to perform:

converting the telemetry data from a Hypertext Transfer Protocol (HTTP) archive (HAR) format into an Open Telemetry Protocol (OTLP) format.

10. The apparatus of claim 8, wherein the processor is further configured to perform:

translating each of the plurality of requests into a span that includes metadata of a respective request, and the page load performance metrics including a start time of the respective request and an end time of the respective request; and generating at least one trace that includes a first identifier of the monitoring agent, a second identifier of the synthetic test, and a plurality of spans for the plurality of requests.

11. The apparatus of claim 10, wherein the processor is configured to generate the web performance telemetry data by:

periodically querying an external service associated with the monitoring agent for the one or more attributes; and storing the one or more attributes in a local storage.

12. The apparatus of claim 11, wherein the processor is configured to generate the web performance telemetry data further by:

removing one or more stale performance metrics from the telemetry data based on a predetermined time threshold to generate real-time telemetry data;

obtaining, from the local storage, the one or more attributes based on the real-time telemetry data; and adding the one or more attributes to the real-time telemetry data.

13. One or more non-transitory computer readable storage media encoded with software comprising computer executable instructions that, when executed by a processor, cause the processor to perform a method including:

obtaining, from a monitoring agent, telemetry data associated with one or more network communications provided to a web-based service;

generating web performance telemetry data from the telemetry data by injecting one or more attributes about at least one of the monitoring agent or the one or more network communications, wherein the one or more attributes are obtained separately from the telemetry data; and streaming the web performance telemetry data to one or more observability services by:

instantiating, for each integration specifying a respective observability service of the one or more observability services, a dedicated exporter instance, replicating the web performance telemetry data for the instantiated dedicated exporter instance, and exporting the replicated web performance telemetry data to the respective observability service.

14. The one or more non-transitory computer readable storage media according to claim 13, wherein the one or more network communications include a synthetic test having a plurality of requests, and the telemetry data is responsive to the synthetic test and includes page load performance metrics.

15. The one or more non-transitory computer readable storage media according to claim 14, wherein the computer executable instructions cause the processor to perform:

converting the telemetry data from a Hypertext Transfer Protocol (HTTP) archive (HAR) format into an Open Telemetry Protocol (OTLP) format.

16. The one or more non-transitory computer readable storage media according to claim 14, wherein the computer executable instructions cause the processor to perform:

translating each of the plurality of requests into a span that includes metadata of a respective request, and the page load performance metrics including a start time of the respective request and an end time of the respective request; and generating at least one trace that includes a first identifier of the monitoring agent, a second identifier of the synthetic test, and a plurality of spans for the plurality of requests.

17. The computer-implemented method of claim 1, wherein the one or more network communications include a synthetic test having a plurality of requests for testing loading speed of a plurality of elements within a Document Object Model (DOM) of a web page of the web-based service, the telemetry data being responsive to the plurality of requests and being in a form of a waterfall chart including, for each of a plurality of objects on the web page, one or more individual timings.

18. The computer-implemented method of claim 1, further comprising:

querying a metadata service for test identifiers having associated integration with one or more observability services; and filtering the obtained telemetry data to remove messages that have test identifiers that do not match the test identifiers obtained from the metadata service.

19. The computer-implemented method of claim 2, wherein the one or more attributes include an integration identifier that uniquely identifies an integration between the synthetic test and a target observability service of the one or more observability services.

20. The computer-implemented method of claim 19, further comprising:

maintaining, for the integration, a list of associated synthetic tests and determining, based on the list of associated synthetic tests, whether the web performance telemetry data for the synthetic test is to be exported to the target observability service.

* * * * *